United States Patent [19]

Brown et al.

[11] Patent Number: 5,384,610
[45] Date of Patent: Jan. 24, 1995

[54] WRAP AROUND TEMPLATE FOR FILM CASSETTE

[75] Inventors: Samuel Brown, Framingham; Michael J. Phelan, Braintree; Nicholas M. Werthessen, Holliston, all of Mass.

[73] Assignee: Polaroid Corporation, Cambridge, Mass.

[21] Appl. No.: 38,848

[22] Filed: Mar. 29, 1993

[51] Int. Cl.$^6$ .............................................. G03B 17/24
[52] U.S. Cl. .................................................... 354/108
[58] Field of Search ..................... 354/107, 108, 276

[56] References Cited

U.S. PATENT DOCUMENTS

| | | | |
|---|---|---|---|
| 2,137,380 | 8/1937 | Billing et al. | 354/283 |
| 2,322,032 | 6/1943 | Kunze | 354/62 |
| 3,102,459 | 9/1963 | Zimberoff | 354/105 |
| 3,699,856 | 10/1972 | Chabot et al. | 354/62 |
| 3,916,423 | 10/1975 | Ueda et al. | 354/108 |
| 4,268,144 | 5/1981 | Wheeler | 354/108 |
| 4,717,930 | 1/1988 | Wheeler | 354/108 |
| 5,142,311 | 8/1992 | Olson et al. | 354/120 |
| 5,144,348 | 9/1992 | DiSanzo et al. | 354/108 |
| 5,262,808 | 11/1993 | Mauchan | 354/108 |

Primary Examiner—Michael L. Gellner
Assistant Examiner—J. K. Han
Attorney, Agent, or Firm—John J. Kelleher

[57] ABSTRACT

A template is mounted in the exposure aperture of a film cassette. Indicia situated on the template are recorded on exposed film units which provide a size reference for physical structure pictured in a developed photograph. Photographs taken of the same subject separated by time but having the same template and camera location allow a comparison of the subject to determine physical changes in the time period between photographs. To anchor the template in an operative position a tail projects from one side thereof and wraps around a trailing end wall of the cassette where it is frictionally engaged by the cassette and internal components of the camera.

5 Claims, 2 Drawing Sheets

WRAP AROUND TEMPLATE FOR FILM CASSETTE

BACKGROUND OF THE INVENTION

1. Field of the Invention

This invention relates to a template for mounting in a film cassette having structure to anchor the template in place. Indicia printed on the template and an image of a subject are to be simultaneously recorded on a film unit during its exposure which allows a size comparison of the same subject photographed at different times from the same location.

2. Description of the Prior Art

Techniques for measuring physical change in structures, shore lines, facial wounds, skin eruptions and the like may be documented by photographs of the subject. Two or more photographs of the same subject, taken at different times, allow a comparison of the feature of concern. To have comparable photographs requires that the camera be set in the same spacial location with respect to the subject. Thereby, the physical characteristic being photographed can be measured in each photograph to allow the comparison.

U.S. Pat. No. 2,322,032 to Kunze describes such a photographic technique to measure the progress of healing or changes in physical structure of the facial features of a patient.

A patent to Zimberoff, U.S. Pat. No. 3,102,459, uses the technique for identification of individuals by ear configuration and using a grid technique of concentric dots as an overlay to the photograph.

A patent to Chabot et al., U.S. Pat. No. 3,699,856, discloses photographing facial features with an overlay having a grid system which is superimposed on the photograph to allow the comparison of physical features of the same individual at separate times.

A patent to Ueda et al., U.S. Pat. No. 3,916,423, discloses a template having a grid system used in relation to photographs to measure physical sizes. The structure disclosed for retaining the template or overlay within the film cassette comprises transversely projecting ears from each side of the template to fit within the film cassette at the exposure opening.

A patent to Wheeler, U.S. Pat. No. 4,717,930, discloses a camera using instant photography techniques which incorporates a transparent template mounted in the exposure opening of a film cassette inserted into the camera.

Placing templates in the exposure opening of a film cassette of instant photography-type cameras for purposes of having a particular indicia on each successive film frame is known as shown in the above cited patents. Other examples are disclosed in commonly owned, U.S. Pat. Nos. 5,142,311 and 5,144,348. All of those patents disclose techniques for trying to maintain the template properly anchored within the exposure opening of the film cassette from one photograph to another such that the resulting photographs are uniform with respect to the location of the indicia on the resulting photograph. Uniformity of location in the film frame is both the desire and the problem.

Frictional engagement between a template located within a film cassette and in direct contact with an adjacent film unit inherently results in a frictional engagement which may dislocate the template when the exposed underlying film unit (or dark slide) is ejected from the cassette in a normal instant film exposure and processing cycle. There is a need for a secure anchor for the template within the exposure opening, and indeed, the need for a secure anchor is acute where the template has a grid system for printing on the photograph in order to allow physical comparisons of photographs of the same subject taken at different times from the same location.

SUMMARY OF THE INVENTION

To overcome these problems, a template is provided, preferably formed from a transparent acetate of a generally rectangular shape and with a trailing tail projecting from a trailing edge thereof. The tail wraps around a trailing end of a film cassette and is held frictionally in place when sandwiched between the housing of the cassette and internal camera components. The template is designed to be of greater width and greater length than an exposure opening in the film cassette into which it fits. The film cassette itself is a standard box-like housing having an exposure opening in its forward wall. The template is flexed into place in the exposure opening with each side edge fitting inside the forward wall of the cassette and being sandwiched between a dark slide and the interior surface of the forward wall prior to the time the cassette is inserted into the camera. The forwardmost end of the template also fits beneath the forward wall of the cassette in the same sandwiched configuration.

On the other hand, the trailing or rear edge of the rectangular portion of the template is designed to press against a peripheral edge of the exposure opening in the cassette. Integral with the template and projecting from this rear template edge is a tail or strip of acetate generally centrally located along the trailing or rearmost template edge. The tail is designed to project out of the exposure opening and loop around the rearmost wall of the cassette to double back and extend across the bottom wall of the cassette where its end is located under a pull tab, a tab that adhesively is secured to the bottom surface thereof and extends forwardly of the cassette's leading end wall.

A battery is incorporated in the film cassette and the cassette has two openings on its bottom surface. The openings expose two electrical contacts of the incorporated battery. The tail on the template is centrally located, extends generally perpendicular to a surface of the template and bifurcates the bottom surface of the film cassette equidistant between the two battery contacts.

When the template is properly positioned on the film cassette, its tail is frictionally captured between the external surface of the cassette's bottom wall and camera structure which forms a portion of the camera's film cassette receiving chamber within the camera. Thus captured, the tail serves to securely anchor the template against frictional ejection from the cassette when the dark slide or one of the exposed film units is ejected. Also, the template may be removed from the cassette for use in another cassette. This is accomplished by manually grasping the superposed cassette tab end and the end of the tail simultaneously and pulling them in a direction which will remove the film cassette from its camera chamber. The template may then be removed from the cassette and inserted into a new film cassette. It is contemplated that frictional engagement of the tail by the cassette housing and associated camera components will be all that is required for maintaining the template in position.

Objects of the invention not understood from the above will be appreciated fully upon a review of the drawings and description of the preferred embodiment thereof which follows.

DESCRIPTION OF THE PREFERRED EMBODIMENT

Figure 1:
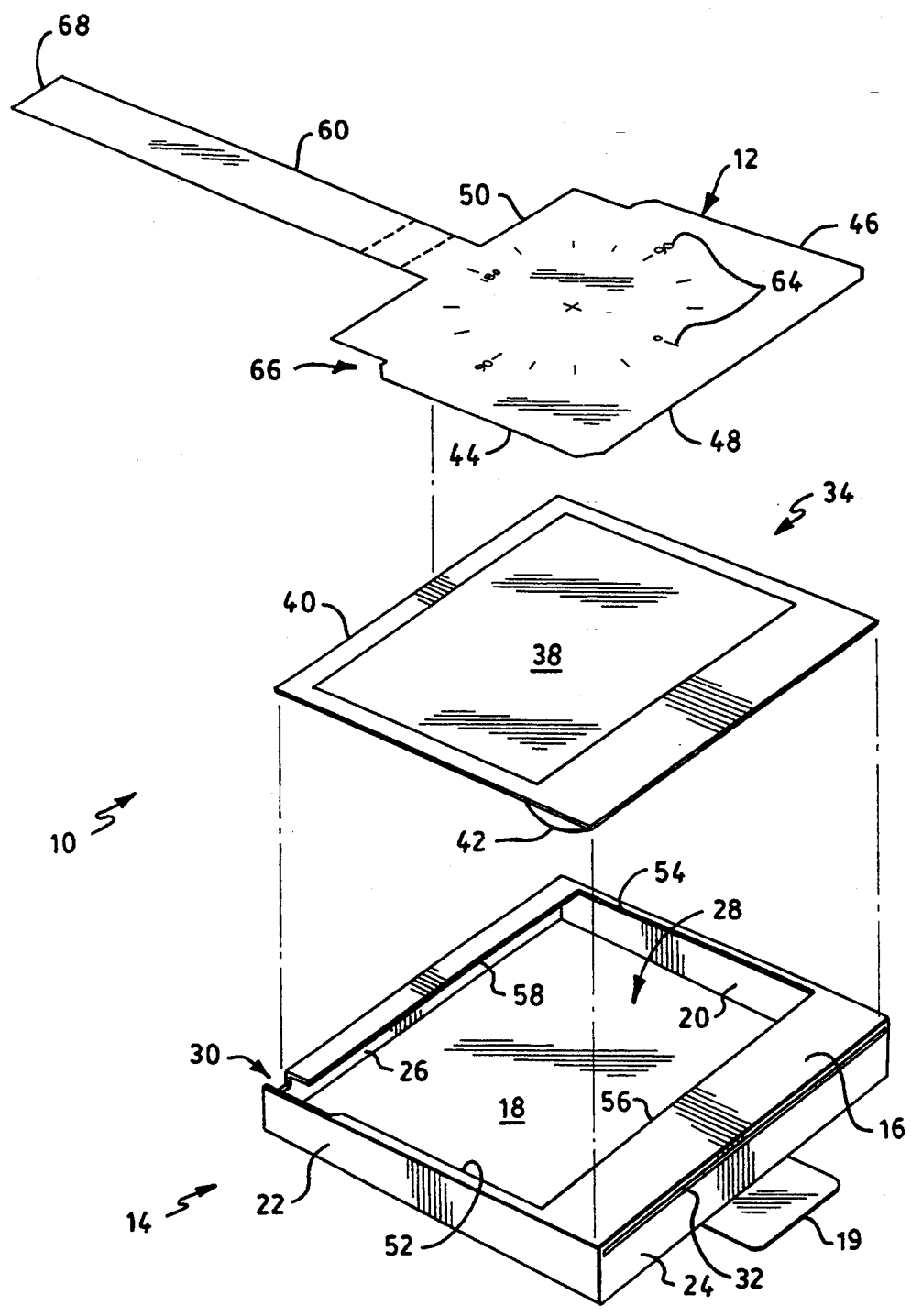
FIG. 1 is an exploded perspective view of a photographic film assemblage and a preferred embodiment of an image bearing template which is adapted for use therewith.
Figure 2:
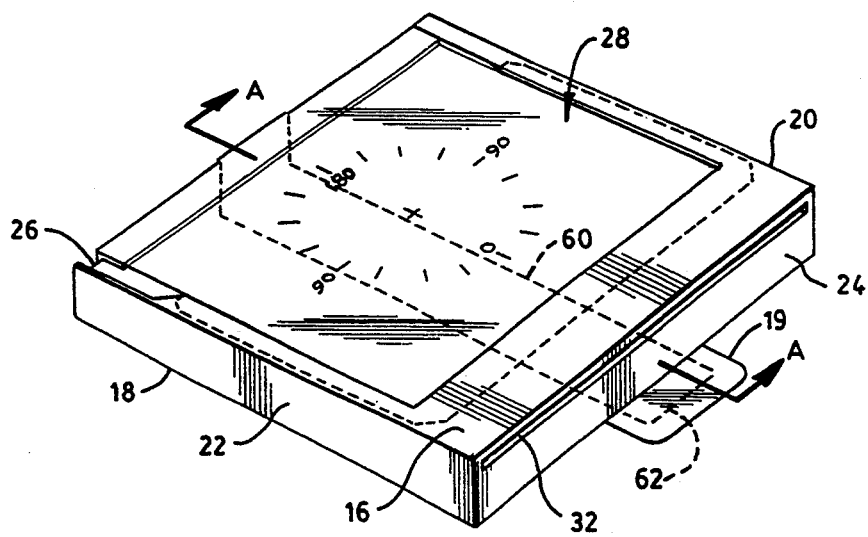
FIG. 2 is a perspective view of the cassette, showing the template assembled in its operative position.

Reference is now made to FIG. 1 of the drawings wherein is shown a photographic film assemblage 10 and a preferred embodiment of an image bearing template 12 which is specifically designed for use therewith. The film assemblage 10 includes a cassette 14 having spaced forward and bottom walls 16 and 18, respectively, a pair of laterally spaced side walls 20 and 22, and longitudinally spaced leading and trailing end walls 24 and 26, respectively. The forward wall 16 includes therein an exposure aperture or opening 28. The forward wall 16 also includes an elongate opening 30 which also extends part way down the trailing end wall 26. The leading end wall 24 cooperates with an edge of the forward wall 16 to define a film unit exit opening 32.

Figure 3:
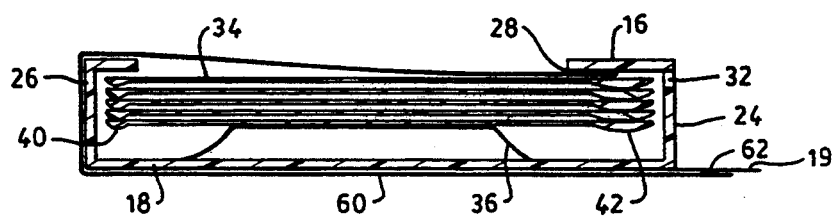
FIG. 3 is a sectional view taken along line A—A of FIG. 2.
Figure 4:
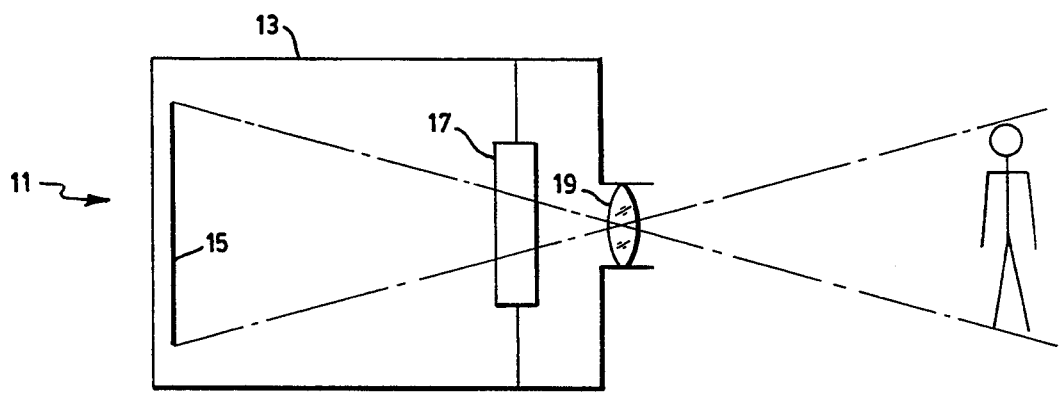
FIG. 4 is a schematic diagram of a conventional photographic camera of the instant or self-developing type.

Supported within the cassette 14 is a stack of individual film units 34 (only one being shown in FIG. 1), preferably of the instant or self-developing type and a spring platen 36, see FIG. 3, for supporting and urging the stack toward the forward wall 16 such that the uppermost film unit 34 in the stack is located in engagement with the interior surface of the forward wall 16. Thus positioned, the photosensitive area 38 of the film unit 34 is located in alignment with the exposure window 28 of the cassette 14. A dark slide (not shown) is initially located between the uppermost film unit 34 and the interior surface of the forward wall 16 to prevent premature exposure of the film unit 34 during the loading of the film assemblage 10 a conventional self-developing camera 11 such as that shown in schematic in drawing FIG. 4. The camera 11 comprises a light-tight housing 13 enclosing a film plane 15 and a conventional shutter mechanism 17 for admitting image-carrying light rays refracted by a lens 19 to the film plane 15, during an exposure interval. Subsequent to such loading, a camera mounted film advancing means or pick (not shown) is actuated such that it enters the cassette 14 via the opening 30, engages a trailing edge of the dark slide and moves its leading end out of the cassette 14 via the opening 32 and into the bite of a pair of spread rollers which completes dark slide removal. With the dark slide removed, the uppermost film unit 34 is urged upwardly by the spring platen 36 into engagement with the interior surface of the forward wall 16 for its eventual exposure. Subsequent to its exposure, the aforementioned film advancing means is again actuated so as to move it into engagement with a trailing edge 40 of the film unit 34 and move the latter partially out of the cassette 14 via the opening 32 and into the bite of the aforementioned rollers. As is well known in the art, the rollers continue the advancement of the exposed film unit 34 from the cassette 14 while simultaneously rupturing a pod or container 42 of processing liquid and spreading its contents between predetermined layers of the film unit 34 so as to initiate the formation of a visible image therein.

In accordance with the instant invention, the image produced within the film unit 34 may be supplemented by placing the image bearing template 12 between the image bearing light rays entering the camera via its objective lens and shutter and the film unit being exposed. At this point it should be noted that although the templates shown in the drawings produce images having a finite definition, the term "image bearing template" also includes a template which will produce an image having a nonfinite definition. The illustrated indicia 64 in Fig. I comprise radially extending spokes on a wheel with angle indications. For this invention the indicia may be a grid system, a series of geometrically aligned dots, etc. The function of the indicia will be explained subsequently in more detail.

The image bearing template 12 is a thin (0.005") generally planar, rectangular, resilient sheet of transparent acetate material. The template 12 includes laterally spaced, parallel, longitudinally extending side edges 44 and 46, and longitudinally spaced, laterally extending leading and trailing edges 48 and 50, respectively. The lateral distance between the side edges 44 and 46 is slightly greater than the corresponding lateral distance between the side edges 52 and 54 of the exposure window 28. The longitudinal distance between the leading and trailing edges 48 and 50 of the template is greater than the corresponding distance between the forward and rearmost edges 56 and 58, respectively, of the exposure opening 28 but less than the corresponding distance between the cassette's leading and trailing end walls 24 and 26, respectively. The template 12 may be manually inserted into its operative position between the dark slide (not shown) and the interior surface of the forward wall 16 of the cassette 14 by flexing the template 12 so as to enable its side edges 44, 46 to be inserted under the side edges 52, 54 of the exposure opening 28. Then the template 12 is urged toward cassette leading wall 24 until template forward wall 48 slides under forward wall 56 of the exposure opening 28. That leaves trailing template edge 50 abutting rearmost exposure opening edge 58 with a tail or acetate strip 60 projecting out of opening 28 from the edge 50. Tail 60, being of greater length than the rectangular portion of the template, loops around the trailing end wall 26 and along the bottom wall 18 to a position where its end 62 underlies a pull tab 19. The pull tab 19 is fixedly secured to the bottom wall 18 and extends forwardly of the cassette's leading end wall 24. This prevents an indicia or image bearing portion 64 of the template 12 from becoming longitudinally displaced relative to the photosensitive area 38 of the uppermost film unit 34 during the withdrawal of an underlying dark side or exposed film unit.

It should be noted that the template 12 may be cut away at 66 from the edges 44 and 50 such that the aforementioned film advancing means is provided with clearance therefrom as it extends into the cassette 14, via the opening 30, and engages either the trailing end of the dark slide, or the uppermost film unit 34 if the dark slide has been previously removed, without being able to engage the template 12.

The aforementioned indicia 64 may be printed on either side of the template 12. However, it is preferred to print the indicia 64 on the side of the template 12 facing away from the film unit 34 in order to prevent scratching of the indicia and possible removal of a portion thereof during removal of an underlying dark slide or film unit. Such indicia may be originally protected by a peelable transparent cover sheet (not shown) which would be releasably secured to the face of the template containing the indicia and which would be manually removed therefrom prior to inserting the template 12 into the cassette 14.

The indicia 64 is indicated as spokes and angular relationships, but it may more preferably use a grid system having spaced horizontal and vertical parallel lines. As used in a medical facility, the patient is located by a brace, physically attached to the camera, such that the patient's face, arm, or the like is oriented and located the same distance from the lens of the camera on the first photograph and all subsequent photographs. Subsequent photographs may be taken, for example, one month apart for a year. That allows the physician and the patient to observe an area of concern on the patient and compare any changes by an observation of the aforementioned grid system lines with respect to said area. A shrinking of a wounded area, for example, will be abundantly clear, and should the area in question be expanding, that will also be evident. Specifically, a feature photographed a number of times by a camera from the same location and using the same template, but at different times, provides graphic evidence of the size of physical changes in the feature by a comparison of successive photographs.

In an alternate embodiment, the pull tab 19 is employed to adhesively bond the trailing end 68 of template tail 60 to the underside of the cassette 14. In such an arrangement the trailing end 68 of tail 60 would be placed between the bottom wall 18 of the cassette 14 and an adhesive surface of the pull tabs 19 in order to achieve the requisite bonding. The reason for such bonding is to prevent the strip 60 from hanging up on the components of the camera during insertion and extraction of the cassette 14. It will be appreciated that other means of bonding the trailing end 68 to the underside of the cassette 14 may be appropriate without departing from the inventive concept. Indeed, the template 12 may be removed from the cassette in which it is first used and later used with other cassettes, even without any bonding between the tail 60 and the underside 18 of the cassette 14 as described in the preferred embodiment.

It is anticipated that the grid system recorded on the template for printing on exposed film units will be of great use in the medical field by occupational therapists, recreational therapists, physical therapists, nurses and ultimately doctors to provide an objective measurement system to assist in assessing patient care and progress. The combination of the grid system on the template with the tail 60 to anchor the template in position in the exposure opening of the cassette 14, will greatly minimize work of these professionals by virtue of preventing longitudinal displacement of the template from one exposed film unit to another.

A camera combined with a film cassette, preferably of the instant developing-type, is a common, well-known camera usage. Accordingly, the lens, camera housing, rollers for rupturing the aforementioned pod of developer liquid, etc., are not shown. To the extent necessary for a full understanding of camera operation and using a template therewith, reference is made to co-pending, co-owned U.S. patent application Ser. No. 803,101 filed Dec. 5, 1991 by Mauchan and, (now U,S. Pat. No. 5,262,808) to the extent necessary, said application is specifically incorporated herein by reference.

While certain preferred embodiments of the present invention have been disclosed in detail, it is to be understood that various modifications may be adopted without departure from the spirit of the invention or scope of the following claims.

What is claimed:

1. A template for use in a camera between a camera lens and a film unit, said film unit to be exposed and moved transversely of image-containing light rays refracted by said lens after exposure, said template comprising:

a transparent sheet having indicia thereon for placement of an indicia carrying surface thereof adjacent and generally parallel to an image-forming area of the film unit, wherein said sheet is rectangular and has a width and a length, with said indicia being located on said sheet so as to be recorded on the film unit upon exposure and wherein said indicia comprises a geometric pattern which is recorded on the film unit when the film unit is exposed whereby a physical structure photographed a plurality of times by a camera from a particular location and with a particular template, but at different times, provides graphic evidence of changes in physical size of an object photographed by a comparison of successive photographs; and means for anchoring said sheet against movement with the film unit, said anchoring means including an elongated strip projecting from a side of said sheet with said elongated strip being longer than the width or length of said sheet, said elongated strip extending parallel to the direction of movement of an exposed film unit and also extending generally perpendicular to the direction of exposed film unit movement when placed in its anchoring position.

2. A template for use in a camera between a camera lens and a film unit, said film unit to be exposed and moved transversely of image-containing light rays refracted by said lens after exposure, said template comprising:

a transparent sheet having indicia thereon for placement of an indicia carrying surface thereof adjacent and generally parallel to an image-forming area of the film unit, wherein said sheet is rectangular and has a width and a length, with said indicia being located on said sheet so as to be recorded on the film unit upon exposure wherein said indicia comprises a geometric pattern which is recorded on the film when the film unit is exposed whereby a physical structure photographed a plurality of times by a camera from a particular location and with a particular template but at different times, provides graphic evidence of changes in physical size of an object photographed by a comparison of successive photographs; and means for anchoring said sheet against movement with the film unit, said anchoring means including an elongated strip projecting from a side of said sheet with said elongated strip being longer than the width or length of said sheet, said elongated strip extending parallel to the direction of movement of an exposed film unit.

3. A template for use in a camera between a camera lens and a film unit, said film unit to be exposed and moved transversely of image-containing light rays refracted by said lens after exposure, said template comprising:
- a transparent sheet having indicia thereon for placement of an indicia carrying surface thereof adjacent and generally parallel to an image-forming area of the film unit, wherein said sheet is rectangular and has a width and a length, with said indicia being located on said sheet so as to be recorded on the film unit upon exposure; and
- means for anchoring said sheet against movement with the film unit, said anchoring means including an elongated strip projecting from a side of said sheet with said elongated strip being longer than the width or length of said sheet, said elongated strip extending parallel to the direction of movement of an exposed film unit and also extending generally perpendicular to the direction of exposed film unit movement when placed in its anchoring position.

4. A template for use in a camera between a camera lens and a film unit, said film unit to be exposed and moved transversely of image-containing light rays refracted by said lens after exposure, said template comprising:
- a transparent sheet having indicia thereon for placement of an indicia carrying surface thereof adjacent and generally parallel to an image-forming area of the film unit, wherein said sheet is rectangular and has a width and a length, with said indicia being located on said sheet so as to be recorded on the film unit upon exposure;
- means for anchoring said sheet against movement with the film unit, said anchoring means including an elongated strip projecting from a side of said sheet with said elongated strip being longer than the width or length of said sheet, said elongated strip extending parallel to the direction of movement of an exposed film unit.

5. In combination a film cassette having at least one film unit therein and a template:
- said cassette having an exposure aperture in a forward wall;
- said template being mounted in said aperture intermediate said film unit and said forward wall, said template having indicia imprinted thereon for recording on said film unit wherein the indicia on said template comprises a geometric pattern which is recorded on said film unit when the film unit is exposed, whereby a physical structure photographed a plurality of times by a camera from a particular location and with a particular template but at different times provides graphic evidence of changes in physical size of an object photographed by a comparison of successive photographs; and
- said template being a generally planar transparent sheet, a side of said sheet including an elongated strip projecting transversely from said sheet and around said cassette in frictional engagement therewith for anchoring said template in a stationary position relative to said cassette wherein said transparent sheet is generally rectangular and has a width and a length with said elongated strip being longer than the width or length of said sheet, said exposure aperture is generally rectangular and said exposure aperture has a width and a length which are less than the width and length of said transparent sheet and includes a slot terminating both in (1) the side of said transparent sheet side having the elongated strip and (2) an adjacent side wherein edges of said transparent sheet which do not have the elongated strip attached are mounted inside said cassette sandwiched between a forward wall of said cassette bordering said exposure aperture and said film units, said elongated strip projecting outwardly through said exposure aperture, and around an end wall of said cassette.

* * * * *